United States Patent
Reymond et al.

[11] 3,943,358
[45] Mar. 9, 1976

[54] TERMINAL AND REPEATER STATIONS FOR TELECOMMUNICATION SYSTEM USING OPTICAL FIBERS

[75] Inventors: Jean-Claude Reymond; Luigi d'Auria; Guy Chevalier, all of Paris, France

[73] Assignee: Thomson-CSF, Paris, France

[22] Filed: July 23, 1974

[21] Appl. No.: 491,129

[30] Foreign Application Priority Data
July 27, 1973 France .................. 73.27573

[52] U.S. Cl. .................... 250/199; 325/1; 350/96 R
[51] Int. Cl.² ................................................ H04B 9/00
[58] Field of Search .......... 325/1, 5, 7, 14; 250/199, 250/201, 206, 216; 350/96 R, 96 C; 179/15 FE, 170 R, 170 J; 178/DIG. 2, 7.1

[56] References Cited
UNITED STATES PATENTS

| | | | |
|---|---|---|---|
| 2,651,715 | 9/1953 | Hines | 250/199 |
| 3,379,826 | 4/1968 | Gray | 178/7.1 |
| 3,727,061 | 4/1973 | Dworkin | 250/199 |
| 3,751,671 | 8/1973 | Maniere et al. | 250/199 |
| 3,845,293 | 10/1974 | Borner | 250/199 |

*Primary Examiner*—Benedict V. Safourek
*Assistant Examiner*—Jin F. Ng
*Attorney, Agent, or Firm*—Cushman, Darby & Cushman

[57] ABSTRACT

In the telecommunication system using optical fibers, each terminal or repeater station comprises negative feedback via an optical channel, the output electroluminescent diode being coupled to the input photodiode by an optical fiber.

2 Claims, 7 Drawing Figures

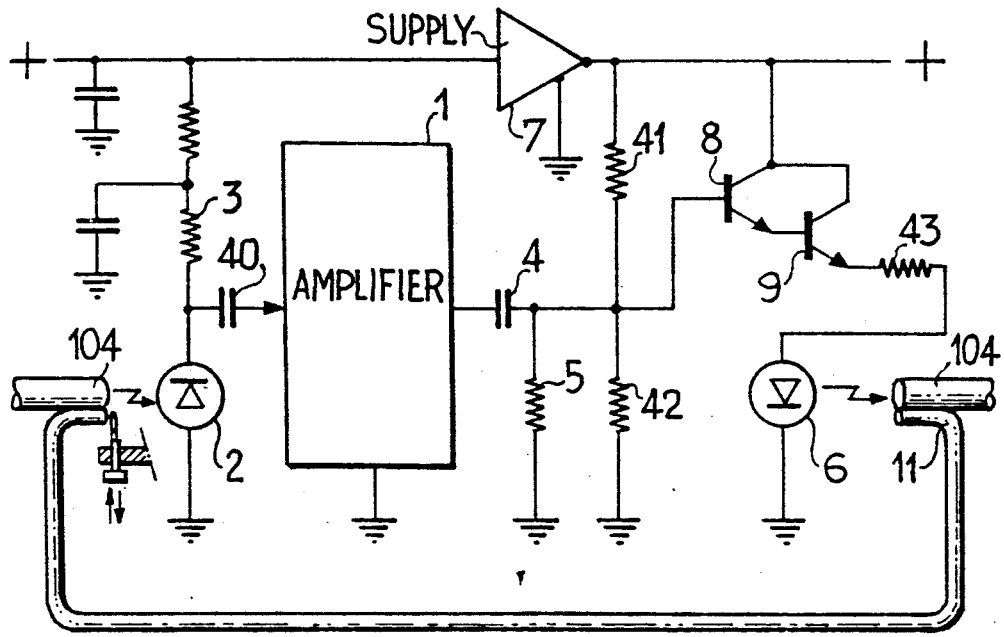
Fig. 3
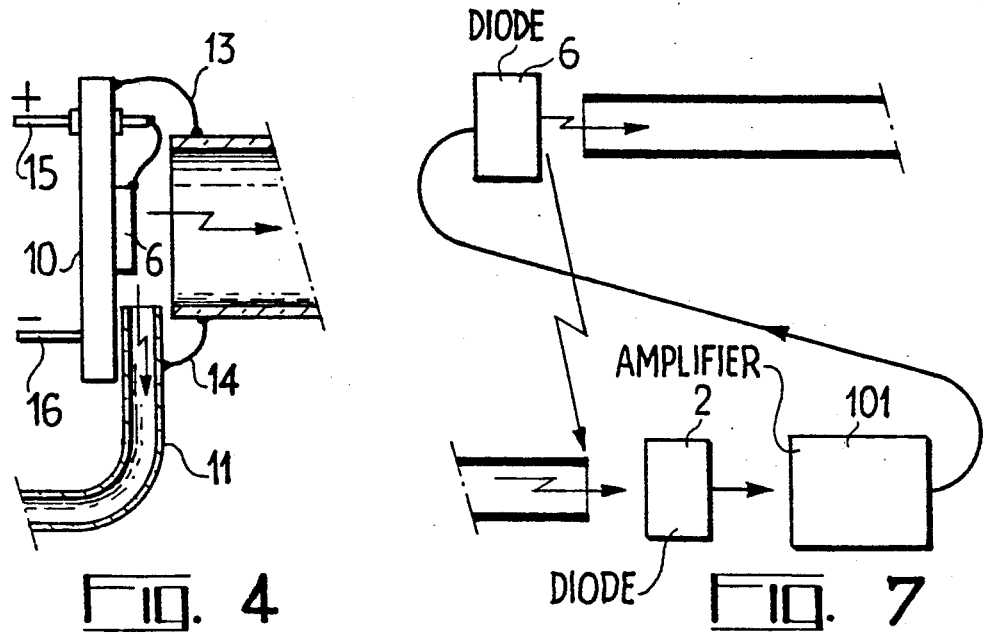
Fig. 4
Fig. 7

3,943,358

TERMINAL AND REPEATER STATIONS FOR TELECOMMUNICATION SYSTEM USING OPTICAL FIBERS

It appears possible to replace conventioned telephone cables by bundles of glass fibers which act like microwave wave guides with regard to light rays. Usually the light rays are modulated. Unfortunately the fibers, like coaxial cables, cause considerable losses of light energy and repeater amplifiers are required for telecommunication purposes.

The amplifiers are connected to the output of a fiber. The optical signal is detected so as to extract the information in the form of an electric signal. The signal is amplified and modulates an electroluminescent transmitter.

It has been found that the transfer characteristic of electroluminescent diodes is not linear. In other words, the intensity of the transmitted beam is not a linear function of the amplitude of the electric signal, and this causes distortion. This is a disadvantage in repeater amplifiers and terminal stations adapted for transmission lines.

The invention relates to a repeater amplifier for an optical fiber cable wherein the aforementioned distortions are eliminated.

The repeater amplifier according to the invention comprises detection means for extracting the electrical signal to be amplified from the optical signal, and also comprises an electro-optical transducer for converting the electric signal into an amplified optical signal.

According to the invention a feedback loop is provided between the input of the detection means and the output delivering the amplified optical signal, the feedback loop comprising an optical-fibre.

The invention will be more clearly understood from the following description with reference to the accompanying drawings in which:

FIG. 3 shows the circuit of a repeater amplifier according to the invention;

FIG. 4 shows an embodiment of the output of the repeater according to the invention;

FIGS. 6 and 7 show variants of the device according to the invention.

The invention is based on the fact that an electroluminescent diode has light-intensity characteristics which are non-linear functions of the current flow.

Figure 1:
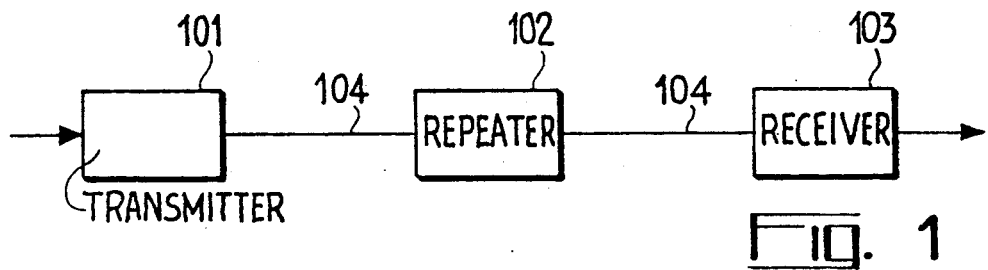
FIG. 1 is a diagram of an optical transmission line.

FIG. 1 shows an optical transmission line comprising a transmitter 101 a receiver 103 and a repeater 102 interconnected by two bundles 104 of optical fibers. The repeater is adapted to compensate transmission losses. If it is desired not to use repeaters capable of directly amplifying the optical information carrying signal, the information in the optical signal has to be demodulated by using photodiodes and by using a conventional amplifier having its output connected to an electroluminescent diode and thus modulates the light radiation transmitted by the diode.

Figure 2:
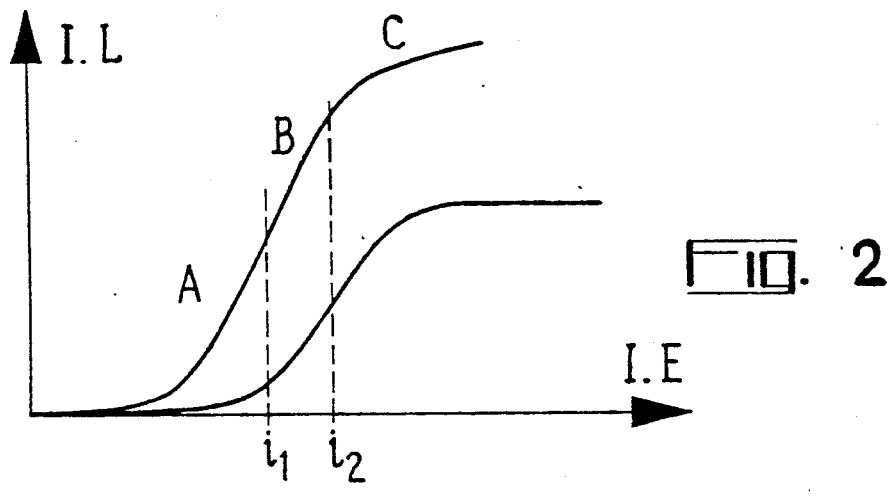
FIG. 2 shows the characteristics of the light intensity of an electroluminescent diode.

FIG. 2 gives curves showing the power of the transmitted radiation as a function of the current through the diode. A number of anomalies can be seen:

a. light radiation occurs only when the electric current through the diode reaches a certain threshold (marked A on the curve);

b. the light power curve is linear between two well-defined current values $i_1$ and $i_2$ (part B);

c. above $i_2$, there is a tendency to saturation;

d. finally, a well-defined curve corresponds to each ambient temperature. The power decreases with temperature.

The result is a distortion in the modulation of the light power, since the gain or ratio of light power to current intensity is not constant even in the linear portion of the characteristics, since it depends on the ambient temperature.

Furthermore, the power of the transmitted light depends on the frequency of the input signal.

It is clear, therefore, that an amplifier, even if very linear, cannot give good results.

The invention provides a means of compensating the aforementioned distortions by using a feedback loop which will be described.

FIG. 3 shows a repeater comprising an amplifier 1 whose input is connected at one terminal of a photodiode 2 by means of a capacitor 40. The same terminal is connected to the positive pole of a high-voltage source via a resistance bridge 3, the other terminal of diode 2 being earthed. The diode is exposed to light radiation from the input optical fiber 104. The output of amplifier 1 is connected to the power supply of the output electroluminescent diode 6, via a capacitor 4 which, together with a resistor 5, forms a high-pass filter and eliminates any d.c. component at the amplifier output. The supply system comprises a regulated supply 7 whose positive pole is connected, via two transistors 8 and 9 in cascade, and a resistance 43 to one terminal of diode 6, the other terminal being earthed. A resistance bridge 41–42 connects the regulated power supply to the ground.

Diode 6 illuminates the input of the output optical fiber 104, and also illuminates an optical fiber 11 connected to the input fiber in front of photodiode 2.

The assembly operates as follows:

When no modulation is applied to diode 6, the diode is directly biassed and emits light radiation which is transmitted by the output optical fiber.

Let $E_o$ be the input signal detected by the photodiode applied to the input of amplifier 1; the signal is e.g. an amplitude-modulated carrier wave having a frequency $f$.

Let $E_s$ be the corresponding output carrier wave. Any information $\Delta E_e$ is shown by an increase or decrease in the amplitude of the carrier wave. Let G be the amplifier gain and $\beta$ be the negative feedback rate due to the loop 11.

The output carrier wave $E_s$ will undergo a variation in amplitude $\Delta E_s$ so that:

$$(\Delta E_i + \beta E_s) G = \Delta E_s$$

by equating the amplitude variation $\Delta E_s$ of the carrier wave $E_s$ with the amplitude variation of the input carrier wave multiplied by the amplifier gain.

This amplitude variation is equal to $\Delta E_i + \beta \Delta E_s$, since the fraction of the output signal is fed back to the input. Consequently, we have:

$$\frac{\Delta E_s}{\Delta E_e} = \frac{1 - \beta G}{G} \approx -\beta$$

Consequently, $\Delta E_r$ is proportional to $\Delta E_e$ and these two values have opposite signs.

The assembly can be used as a unit for the input terminal station, the repeaters and the output terminal station, since the amplifier 1 of the transmitter station can directly receive the carrier wave and deliver its modulation to the optical channel.

As shown in FIG. 3, the amplifier can be used as a repeater and receiver the signal via the optical channel and deliver the amplified signal to the optical channel. Similarly, it can be used as the output terminal station and deliver the carrier wave to an electric channel.

FIG. 4 shows an embodiment of the output of a repeater according to the invention.

The output comprises the diode 6. The diode, made of gallium arsenide, is mounted on a metal holder 10 having a terminal 15 connected to earth and a terminal 16 connected to a power source 7. The metal holder has wires 13, 14 for securing the output fiber 104 and the negative feedback fiber 11. These fibers have diameter e.g. of the order of 10 to 30 microns.

Figure 5:
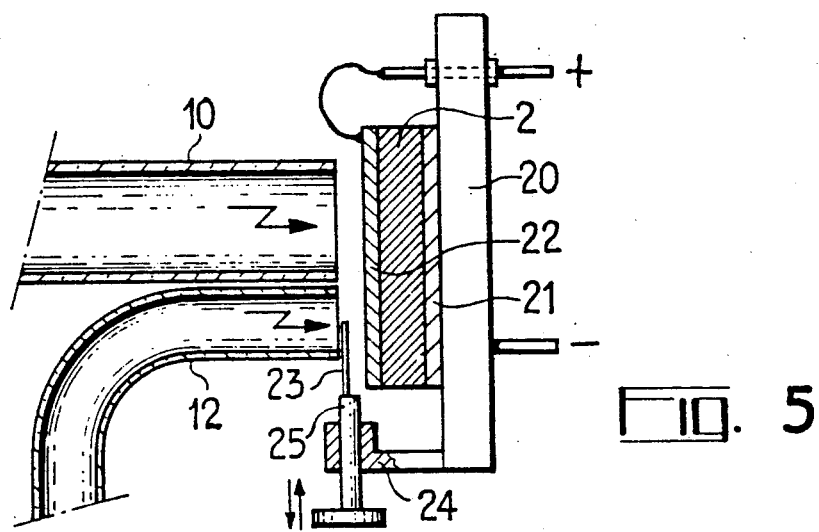
FIG. 5 shows how the input diode of a receiver is assembled.

FIG. 5 shows the input photo-diode of the repeater. Photo-diode 2 rests on a substrate 20 similar to substrate 10, being separated therefrom by a layer of aluminium 21. Diode 2 comprises a layer of silicon made up of two parts which are doped so as to have opposite types of conductivity and form a junction. The diode is covered with a layer of gold 22 and exposed to radiation from input fiber 10 and negative feedback fiber 12.

The negative feedback ratio is determined by the position of a diaphragm 23 which obturated fiber 12 to an extent which varies with its position, which can be adjusted by means of a rod 24 sliding in a holder 25.

Other devices can be used without departing from the invention.

Figure 6:
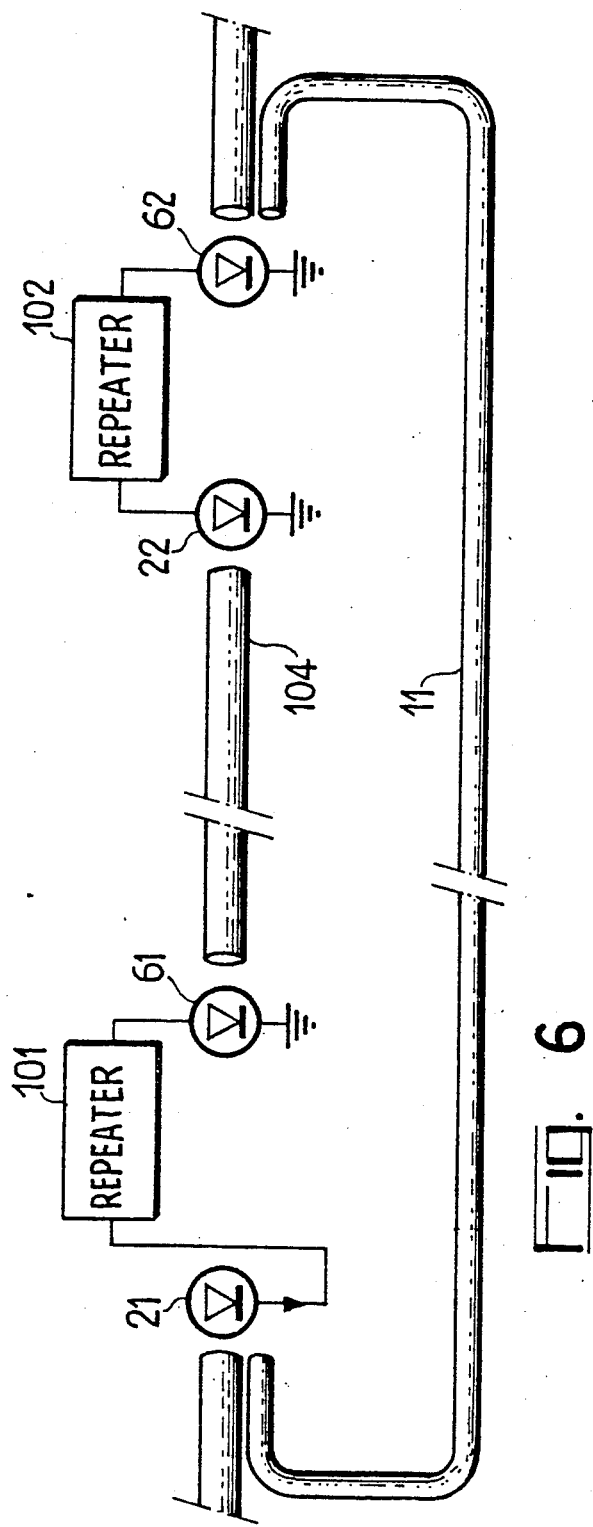

The example in FIG. 6 shows a transmitter which is identical with that in FIG. 1. The electroluminescent diode 61 of transmitter 101 is not coupled to a negative feedback fiber. Instead, diode 62 of the terminal receiver is connected by line 11 to diode 21 of transmitter 101, thus dispensing with a negative feedback line. This system is applicable in certain cases only.

Let L be the distance between 101 and 102. The propagation time in both directions of the signal is $t=2 L/c\, n$, $c$ being the velocity of light and $n$ being the fiber index. This time should be small compared with the period $1/f$ of the carrier wave and we should have:

$$f << \frac{c}{2nL}$$

At a spacing of 1 km, the maximum frequency should be much less than $10^5$ Hz = 100 kHz.

FIG. 7 shows an example wherein the optical negative feedback is produced by direct radiation from diode 6 to diode 2.

What we claim is:

1. An optical fiber telecommunication system comprising a transmitting station, at least one repeating station, and a receiving station, optical fibers for interconnecting said stations and propagating light energy carrying an electric signal respectively transmitted, repeated and received by said stations; each repeating station having an input, a photodiode connected to said electric input for detecting said signal, an amplifier having an input connected to said photodiode for amplifying said electric signal and an output, an electroluminescent diode connected to said amplifier output for transmitting amplified light energy modulated by said electric signal, and optical fiber means coupled to said electroluminescent diode for taking a portion of said amplified light energy and for transmitting said portion backward to said input photodiode of one of said repeating stations disposed between said receiving station and said transmitting station.

2. A system according to claim 1 further comprising means connected to said electroluminescent diode for adjusting said portion of said amplified light energy.

* * * * *